United States Patent Office 3,540,040
Patented Nov. 10, 1970

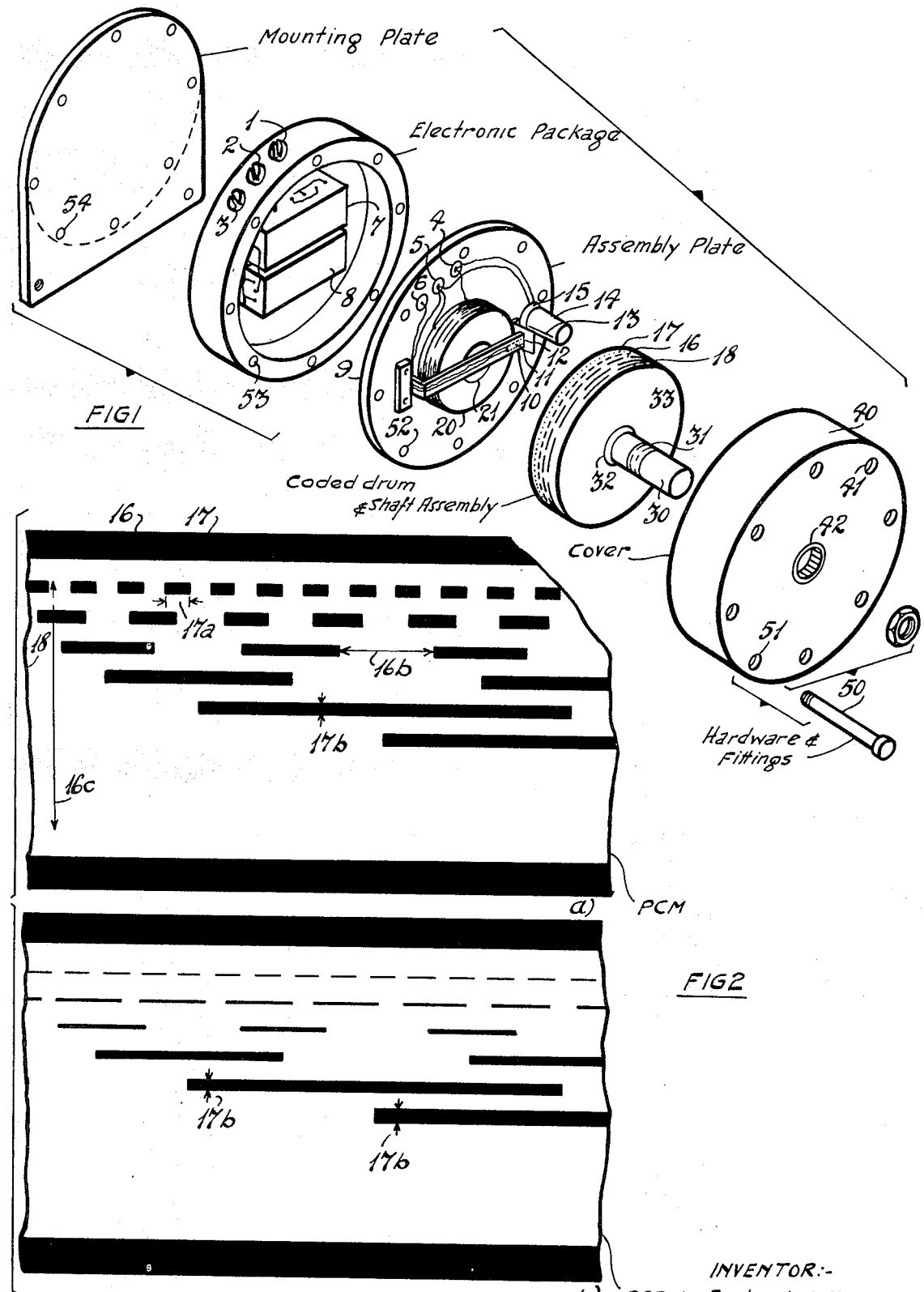

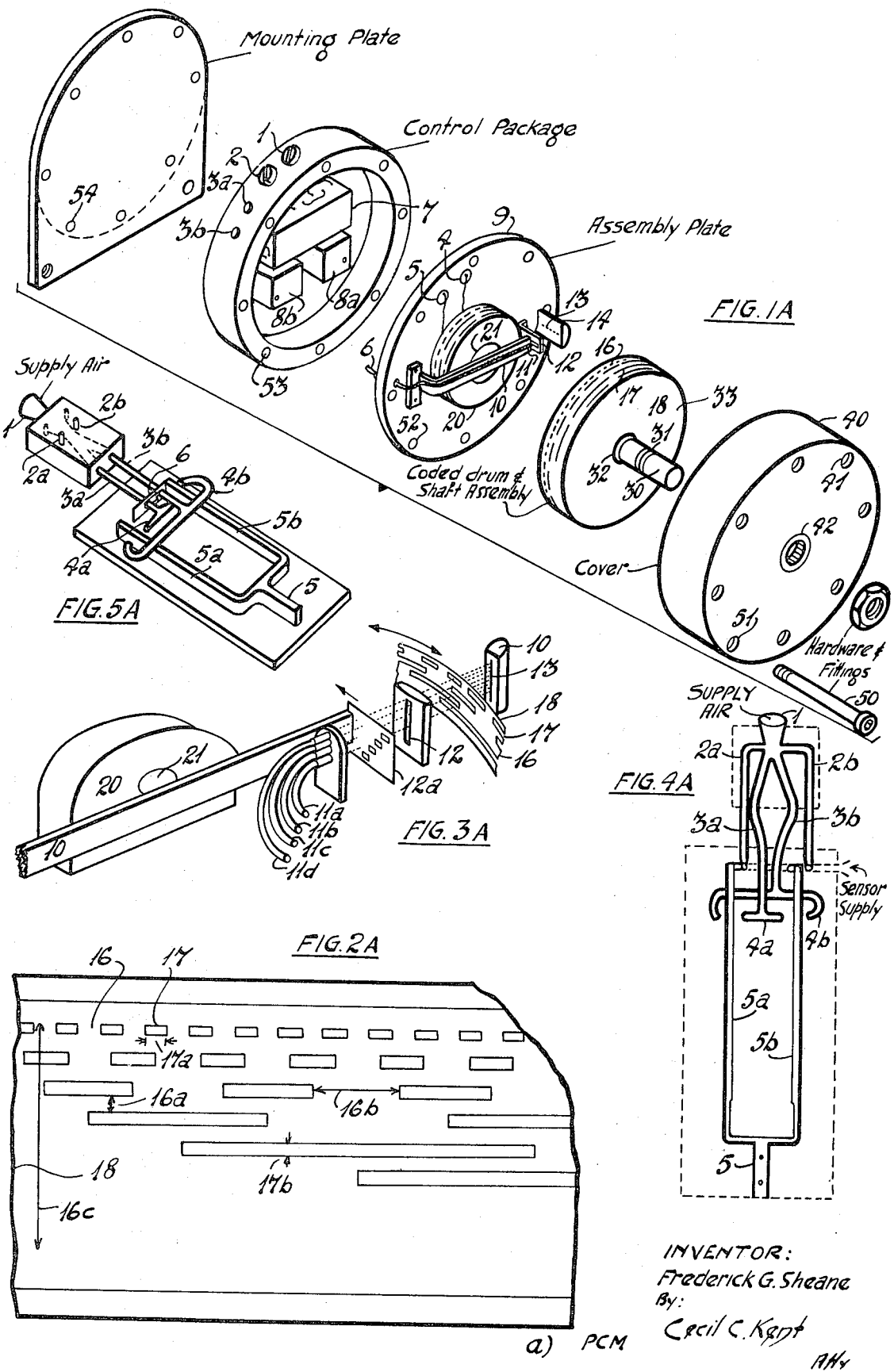

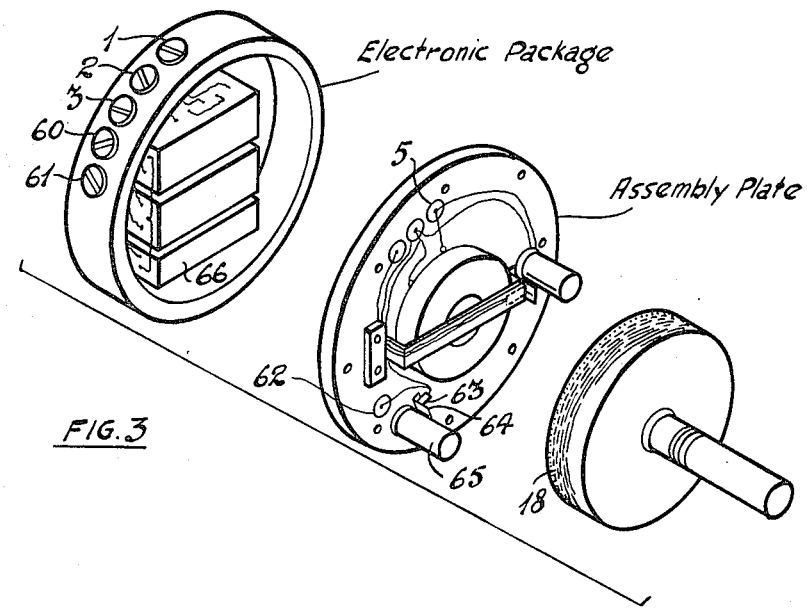
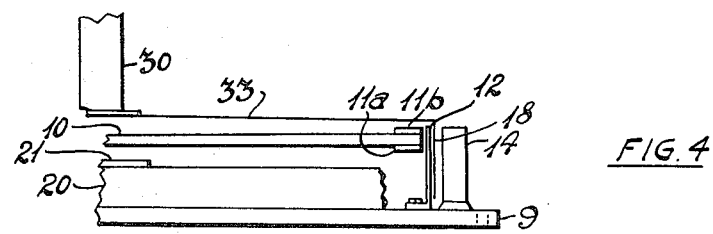
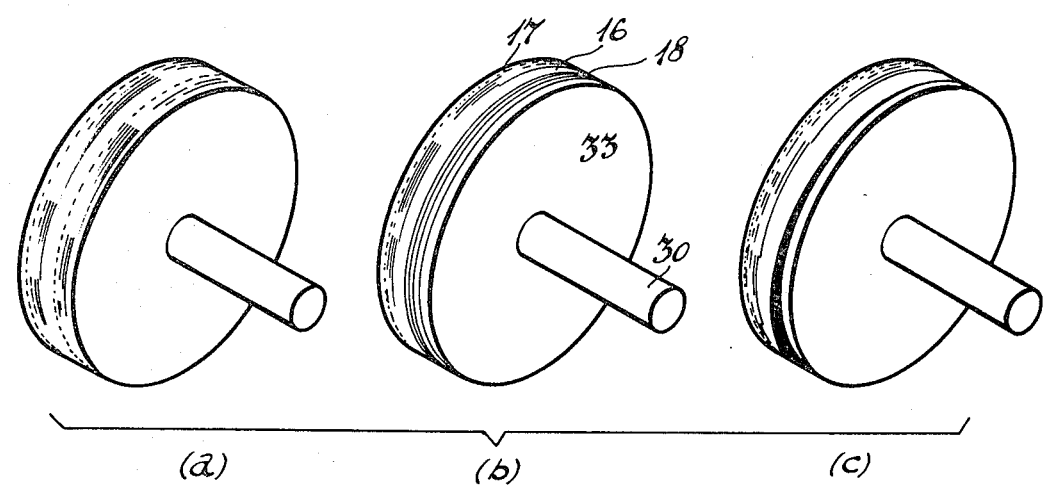

3,540,040
DIGITAL TELEMETRY TRANSDUCERS
Frederick G. Sheane, Clarkson, Ontario, Canada, assignor to Electro Dynamics & Telecom Limited, Chatham, Ontario, Canada
Filed Dec. 29, 1966, Ser. No. 605,707
Int. Cl. H03k 13/00
U.S. Cl. 340—347       3 Claims

ABSTRACT OF THE DISCLOSURE

A shaft angle encoder having a transparent code member coupled to the shaft. The code member has opaque indicia which characterize the incremental angular positions of the shaft. A small light source is positioned on one side of the code member, adjacent the indicia, and a photodetector is fixed to a tyne of a tuning fork, in line with the light source and positioned on the opposite side of the code member. The tuning fork is vibrated thereby causing the photodetector to scan across the indicia and hence to produce a repetition of groups of digital signals which characterize each incremental position of the shaft.

---

This invention relates to systems and apparatus for conveying, data or information, where the data is transmitted to a remote position and is intended for use by a digital measuring system, for example, a digital computer or digital telemetry system. This invention is concerned with converting analog positional information, for example, the exact position of a shaft, to electrical information where the electrical information has multiple properties of pulse modulated patterns which are programmable according to the requirements of most digital measuring systems.

Apparatus and systems for converting analog position to digital information are described as early as 1912 by Scheyer in U.S. Pat. No. 1,172,058 and more recently by U.S. patents: Gridley No. 2,533,242; B. Lippel No. 2,590,110; Lippel No. 2,679,644; Brenner No. 2,685,054; J. O. Beaumont No. 2,747,797; L. J. Kamm No. 2,792,545; R. E. Yaeger No. 2,793,807 and others. With the exception of Scheyer's patent, these specifications relate to systems, and disclose methods utilizing a coded disc where each discrete-angular position of the disc has a radial track containing a unique set of coded patterns and sensors are employed at specific track positions to sense an aggregate composition of some assessible code. Details of operation and parts in combination, of the following U.S. patents have been considered in establishing the specifications of this invention: Sponaugle 2,484,968, Neergaard, 2,628,539, Steele 2,733,430 and 2,733,431, J. Rosenberg (with A. F. Brewen and T. J. Sciutto) 2,833,941 and J. W. Forrester 3,069,608.

Such systems and apparatus have disadvantages of complexity, difficulty of alignment, high cost and low reliability as a direct result of having to employ many sensory devices and multiple wire outputs with parallel information which must be translated by individual discriminators for each data bit, electronic registers, buffers, and associated power supplies and control circuits. Such systems also have the disadvantage that data and information in a form suitable for transmission to a remote position, for example, pulse code modulated data, is difficult to obtain without adding greater cost and complexity to the basic analog to digital conversion apparatus of the above patent specifications and others of similar nature and purpose.

As a result of the principal features of this invention, the analog position of mechanical measuring elements such as Bourdon tubes, bellows, diaphragms, meter movements, etc., can be converted directly to digital information with telemetry characteristics. Mechanical measuring elements such as those listed above are capable of highly accurate measurements of physical variables such as pressure, temperature, flow, level, weight, etc. but are very sensitive also to any external loading. Analog position to digital electric transducers, such as the shaft position encoders, referred to in the above patents, require relatively large forces to rotate the shaft and the associated inertia is also great. Most problems result from the means by which a shaft encoder must be coupled to a measuring element. The invention provides principles of operation which permit direct coupling procedures, and overcome problems associated with sensor alignment, bearing mounts, and mechanical alignment of related housings and apparatus.

In addition to principles provided for the transduction of analog mechanical energy to digital electrical energy, this invention emphasizes, in combination, principles provided for the direct transmission of digital telemetry data, that is, data having the form of a sequence of pulses with accurate time characteristics determining the exact time duration of pulses, and the exact time duration of spaces beween individual pulses. This type of transmission, commonly referred to as pulse code modulation, pulse duration modulation, pulse position modulation and many additional reference names, is particularly valuable because of its time determining, serial characteristics. This type of data allows a single wire or single digital telemetry channel to pass multiple code digital data.

This invention is concerned further with providing digital telemetry data as a result of its principal operating features and cause to eliminate all requirements for associated electronic apparatus of the form used with the systems and apparatus of the patents referred to above. In particular, amplitude discriminating devices of the conventional voltage or current level form are eliminated. Greater reliability is provided by a rate discriminator circuit, and a single signal path rather than one path and discriminator per bit to be encoded. The rate discriminator does not depend on voltage or current levels. The rate discriminator responds to rate of voltage change per unit time. Therefore power supply fluctuations and the deterioration of sensing devices will not have as great an effect on performance as in state of the art level discriminator mechanisms. Having rate sensing discrimination also allows accurate signal filtering at the point of generation which aids greatly in the elimination of spurious noise responses.

Having eliminated extensive additional apparatus requirements, this invention provides complete transducing, and transmitting functions in a very small package and can be more easily mounted at some remote transmitting point or contained in some system which requires analog position to digital telemetry conversion.

It is one object of this invention therefore to provide a system and apparatus for the direct transmission of analog positional data by means of electrical information, in the form of a multiple-unit, serial, time modulated code, which is compatible with the broad range of information input requirements of digital telemetry systems and direct digital computer measurement and control systems.

It is a further object of the invention to provide digital telemetry and digital computer systems with a state of the art advance in the operation of transducer systems and apparatus. This invention introduces an operational concept of discrete quantized systems where the most recent state of the art advances in digital computers, for example, time sharing into asynchronous memory banks and using content addressable memories can be utilized in areas of on line direct digital computer control of industrial and scientific processes, and where the most recent speculations and theories regarding state of the art advances in control systems, for example, non-linear systems having time variant or random quantized data, will be implemented by the apparatus and methods of this invention.

Additionally, this invention relates to systems and apparatus for converting analog positional information, for example the exact position of a shaft, to fluidic information, for example, variations in the flow or pressure of a liquid or gas, where the fluidic information has multiple properties of time division modulation.

The invention is concerned with providing a simple, low cost, highly versatile digital fluidic transducer where the fluidic information will be useful for new components which are evolving from recent advances in the technology of fluid amplifiers or more precisely digital fluidic devices. Because the theories of operation of pure fluid devices are undeveloped, and generally, considered by most experts as in a state of infancy, this invention relates to most known fluid interaction devices having controllable characteristics where fluid implies operation by either gas or liquid means.

As each new technology of energy conversion and control is developed, that new technology finds useful application where apparatus and systems are assembled in such a way that measurement energy, representative of some physical variable or process is sensed, computed, or otherwise manipulated such that some resultant control energy, is realized which can be used as feedback to influence control of that variable or process. One of the most recent technological advances regarding potential energy transfer elements for control apparatus is in the area of miniature fluidic interaction devices.

The fundamental principles of operation of an analog position to digital fluidic transducer are identical in nature to an analog position to digital telemetry transducer with the exception that energy output is fluidic and related output sensory components are fluidic interaction devices, for example, miniature capillary tubes and interruptable jets or ports in unique combination.

A purpose of this invention is to provide an analog position transducer capable of conveying unique digital fluidic command data to the control ports of fluid amplifiers and a broad range of fluidic interaction devices which will be specified apart from this invention.

This invention therefore envisages a multiplicity of features according to the requirements of any particular system of fluidic devices for which the apparatus of the invention is intended and further envisages a multiplicity of features according to the probable requirements of advances in fluidic devices, which have been stated in technical literature from the Sperry Utah Co., Div. of Sperry Rand Corp.; Harry Diamond Laboratories of the U.S. Army's Materiel Command; Advanced Technology Laboratories, General Electric Co.; Moore Products Co.; Corning Glass Co.; Bowles Eng. Corp,. Honeywell Inc., and others including extensive efforts at research centres of the U.S. Armed Forces and space programs.

Further objects of the invention will emerge in the following summary, and as the description proceeds.

The primary features embodied in this invention accordingly provide apparatus having:

Feature 1—a direct digital output with serial, pulse modulated form.

Feature 2—programmable modulation characteristics.

Feature 3—pulse event and time duration or pulse duration linearization and/or variable control.

Feature 4—extremely accurate time stability available, both bit to bit and frame to frame.

Feature 5—very low torque input requirement allowing use with a great variety of primary measuring means in the form of Bourdon tubes, capsules, diaphragms, electrical meter movements, bimetallic elements etc.

Feature 6—an adaptive of self organizing form of quantized system operation in addition to a conventional sampled data or discrete digital system operation.

Feature 7—point of measurement data capabilities.

Feature 8—excellent cost reduction possibilities through modular design, ease of assembly, simple maintenance with in-field possibilities and component reductions in telemetry systems.

Feature 9—miniature size and light weight.

Feature 10—high reliability because of component simplifications and greater accuracy retention because of self aligning, single sensor design.

Feature 11—an integral design planned to accommodate probable future data system requirements.

This invention therefore envisages a multiplicity of features according to the requirements of any particular data system for which the apparatus of the invention is intended and further envisages a multiplicity of features according to the predicted requirements of advanced state of the art data systems, for example, adaptive and self organizing systems, which have been mainly theorized and modelled within an environment of research and development activity, for example, works by Professor H. W. Mergler, Case Institute of Technology, Digital Systems Laboratory, work by Professor Gibson, Purdue University Computation and Control Systems Laboratory and others.

The invention demonstrates apparatus for transduction and direct serial transmission of measurement and control data represented for example by the analog position of an input shaft, at a remote transmitting point, comprising first means coupled to the input shaft in the form of a cylinder where each discrete angular position of the cylinder has on its curved peripheral wall a unique set of coded patterns arranged in bands around and on the peripheral surface where the distance between each band is predictable and where specific binary digit positions of code within each band relative to each other band are aligned in tracks parallel to the axis and on the horizontal plane of the curved surface of the cylinder, and second means comprising a scanning mechanism positioned within the cylinder and having physical movement such that a sensor coupled to the movement of the mechanism will be caused to pass the coded pattern of the cylinder of the first means along a specific track of coded pattern and the movement of the scanning mechanism of the second means having a predictable motion such that the exact rate of travel in one direction and distance of travel in that direction may be determined to have the sensor signal in the form of a serial, time modulated multiple-unit code determined by the combined factors of the coded pattern of the first means and the rate and distance of travel of the sensor which is coupled to the second means such that the serial, time modulated multiple-unit code in the form of a train of electrical pulses occurring in an exact time related sequence will be representative of the exact position of the input shaft.

According to features of the invention, the scanning mechanism is caused to move primarily by electrical energy in the form of a pulse having specific amplitude and duration and the pulse is caused by some control apart from this invention except where the scanning mechanism operates in a synchronous manner and the scanning mechanism is then caused to move by electrical energy controlled from within the embodiment of the apparatus of the invention.

A further feature comprising means in the form of an additional sensor positioned such that the code pattern of any specific band on the cylinder will cause the sensor to respond and provide an additional form of output information which causes the apparatus of the invention to contain a self organizing form of operation where the dependence of control of output information is upon an integral part of the apparatus which additionally contains the exact measurement to be controlled, thus allowing operationally a quantized system where the transmission of measurement data is a function of the specific unit change or variation of the said measurement data. This additional feature allows the apparatus of this invention to order or control its own transmission by way of coupling internally to the scanning mechanism or by way of sending a signal to a remote measuring system, which in turn acknowledges the signal of this feature by sending a pulse to the scanning mechanism thus causing an output of measurement data in the form provided by the apparatus of this invention.

The scanning mechanism of the invention is an electrically driven mechanically time resonant device for example, a vibrator device, driven reed, resonant vibrating reed or tuning fork device.

The sensors of the preceding discussion are electro-optical devices, for example, photo-diodes and photo cells, or electro-magnetic devices, for example, miniature electro-magnetic pickups and miniature R.F. proximity pickups.

In order that the operations of the invention may be more clearly understood, reference will now be made to the accompanying drawings in which:

FIG. 1 illustrates a complete outline of the principal components and fundamental relationship and arrangement of the component parts of the apparatus.

FIG. 2 illustrates a small segment of the surface of the coded cylinder, greatly enlarged to show code mark variations where (a) shows a linear pulse code modulation means and (b) shows a combined pulse code and pulse duration modulation means.

FIG. 3 illustrates a part of the arrangement of FIG. 1 embodying additional components for providing readout command or interrupt date output information.

FIG. 4 illustrates a dual electro-optical sensor assembly with a portion of the coded cylinder cut away.

FIG. 5 illustrates variations in coded cylinder designs where the forms of the coded-patterns provide:

(a) dual channel output with pulse code modulation on each channel.
(b) dual channel output with pulse code modulation on each channel where one channel is discrete measurement data and one channel is fixed address or control data.
(c) dual channel output with pulse code modulation on one channel and pulse duration information on one channel.

Figure 6:
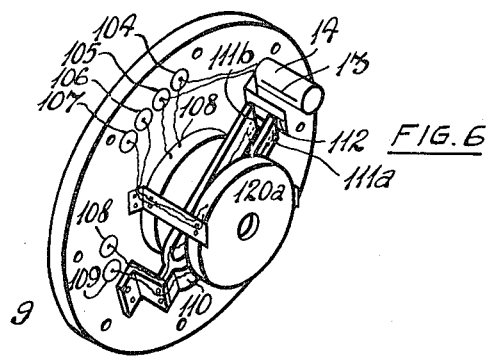

FIG. 6 illustrates a dual sensor scanning mechanism with highly stable time features.

Figure 7:
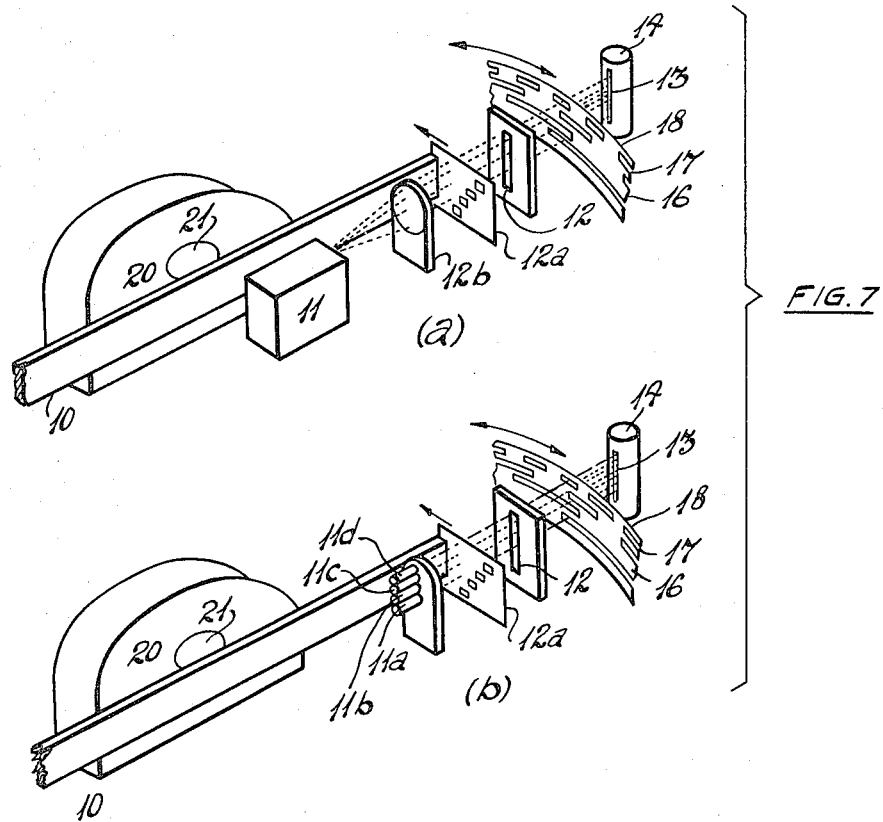

FIG. 7 is a perspective representation of structure utilizing principles of operation (in (a) and (b) thereof) which includes the novel characteristic of a scanning grating.

Figure 8:
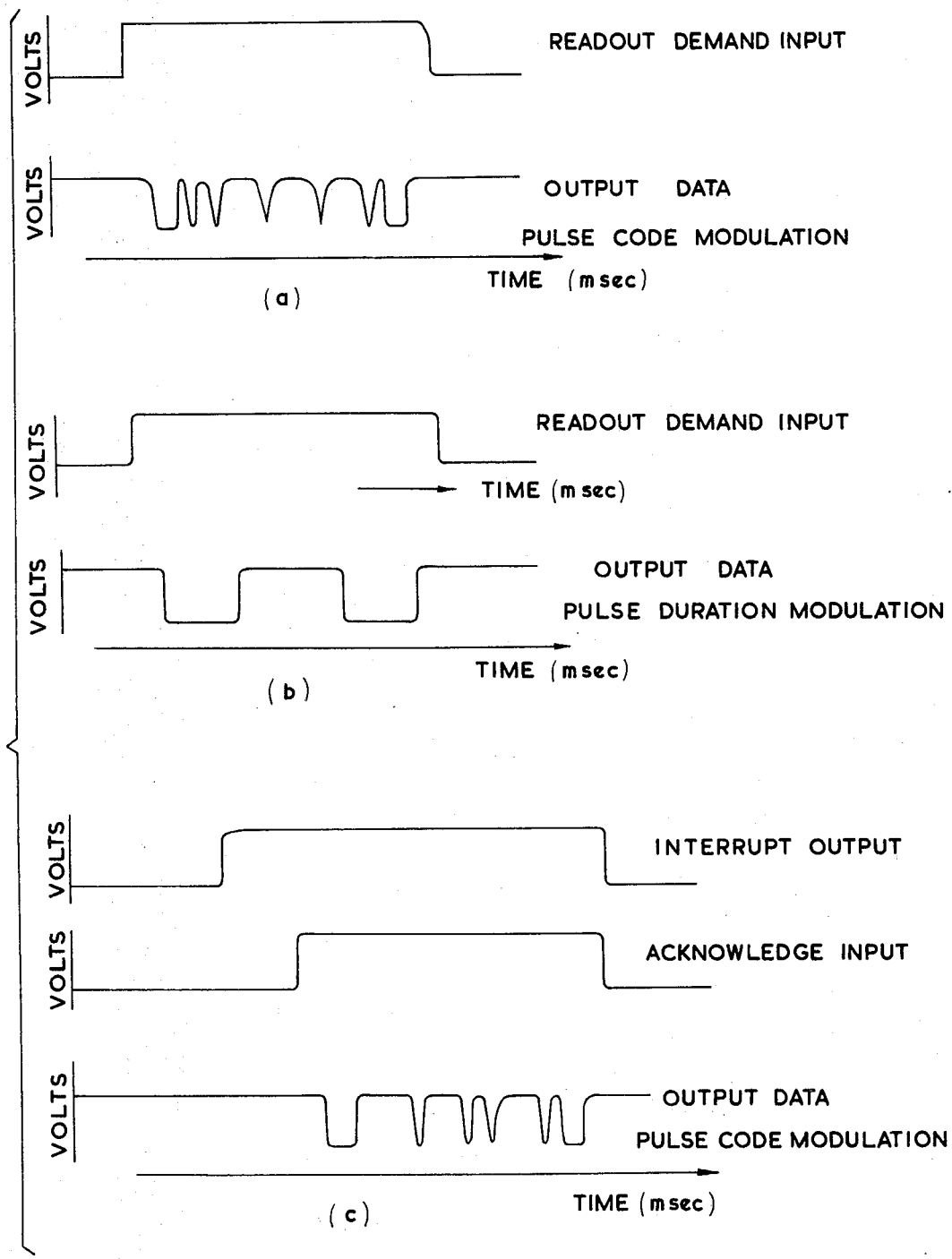

FIG. 8 outlines basic input and output electrical signal waveforms.

FIG. 1A illustrates a complete outline of the principal components and fundamental relationships of the component parts of the apparatus as applied to digital fluidic transducers.

FIG. 2A illustrates a small segment of the surface of the coded cylinder of FIG. 1A greatly enlarged and showing a linear pulse code modulation means.

FIG. 3A illustrates a revision in operation of the two last foregoing figures where a scanning grating provides a modulation.

FIGS. 4A and 5A will be referred to hereinafter.

Describing first the invention as depicted in the accompanying FIGS. 1 through 8, A positive going square wave pulse of approximately 10 milliseconds duration would be applied to the demand input terminal 1. A conventional integrated circuit pulse amplifier 7 places a similar square wave of approximately 12 volts potential at the assembly plate feed through terminal 4. Input terminal 2 is a common point with the associated instrumentation. Feed through terminal 5 is common with the pulse amplifiers 7 and 8. The 12 volt square wave, of approximately 10 milliseconds duration causes lamp 15 in lamp housing 14 to light. Light is emitted through the lamp housing window 13. The same square wave energizes the solenoid 20 and produces an electro-magnetic field through armature 21. The electro-magnetic field causes a resonant reed 10 to move toward the armature.

The photo-diode sensor 11 is coupled to the reed 10. As the reed 10 moves in the direction of the armature a horizontal window in the photo-diode is optically coupled with the vertical optical slit 12. Photo-diode 11 will sense the light emitting from the optical slit 12 and will cause an electrical output. The electrical output is coupled to feed through terminals 6 and 5 and moves on to pulse amplifier 8. Output terminal 3 is driven by pulse amplifier 8. The output continues for the duration that the photo-diode is illuminated.

The coded drum 18, when installed, encompasses the solenoid 20, reed 10, photo-diode 11 and vertical optical slit 12. The drum perimeter wall is between the lamp housing window 13 and the vertical optical slit 12 with very close proximity to the vertical optical slit 12. A coded portion 18 on the cylinder perimeter is composed of a clear or negative material 17 with a discrete opaque bit pattern 17.

As the reed 10 drives the photo-diode 11 towards the armature 21, the discrete light patterns emitting from vertical optical slit 12 cause the photo-diode 11 to respond to light passing from the lamp housing window 13 through the clear drum wall 16 and to return to a zero position as it moves into a dark segment caused by the opaque bit 17 on the drum wall. Thus, as the photo-diode 11 moves toward the armature a discrete pulse pattern will occur at terminals 5 and 6 and pulse amplifier 8 will produce a digital output at terminals 2 and 3.

Since the reed 10 is mechanically tuned, the rate of travel towards the armature can be determined and will become a time parameter which will determine the exact frequency of the digital output. Therefore during the ten millisecond demand input pulse, the digital output will occur and the reed 10 will have come to rest on the armature. When the input demand pulse disappears, pulse amplifier 7 will turn off, the lamp 15 will turn off and the reed will return to its rest position without illuminating photo-diode 11.

A small segment of cylinder surface illustrating a coded pattern is shown in FIG. 2. The distance 16a between each band of coding is variable. The distance 16b between representative positions of binary digits, of code in any one band, is variable. The length 17a and width 17b of each binary digit representation is variable.

Therefore resolution or range of a specific coded pattern can be determined by varying 17a. Where the input shaft of this invention moves in a non-linear manner, the output may be linearized by a combined determination of proper distances for 17a and 16b. The time duration of the representative binary digits can be determined by 17b such that a pulse duration output will be implemented, assuming a suitable scanning rate is used for the sensor. Output linearization of the representation of binary digits and time duration between each representative binary digit position is determined by 16a. Variations in scanning mechanism travel is determined by distance 16c which in part limits and determines appropriate dimensions 16a and 17b. Assuming in all of the foregoing, the methods and mechanisms of detection cause to limit the smallest possible discrete mark or code which may be resolved reliably.

In FIG. 3 an additional lamp and housing 65 is mounted on the assembly plate 9 outside the coded drum perimeter. A photo-diode 63 is fixed on the light source 65 and a vertical optical slit 64 is adjusted to cover the desired band of bits 17. The coded drum 18, when in place, moves in a horizontal plane relative to the vertical optical slit 64. When the coded drum 18 rotates a small amount, the photo-diode 63 will sense a light intensity change as a result of the sequential bit 17 and clear 16 pattern of the drum 18. The photo-diode 63 drives a conventional Schmitt trigger and pulse amplifier micro circuit 66. When the photo-diode goes from light to dark, the flip flop and pulse amplifier circuit 66 is turned on and the output line 61, called an interrupt line, is energized. Standard digital computers and recently developed digital instrumentation will recognize the interrupt signal and send a demand pulse to energize terminal 1. The transducer will read out as discussed earlier in the operation of figure.

The adaptive components require a constant voltage to operate the lamp 65 and electronic circuits 66.

The adaptive or self organizing variations do not affect the normal operation as outlined in the description of FIG. 1 and a standard sampled date method will apply. When it is desirable to reduce the requirement to continuously measure a variable however, the adaptive features will take over and interrupt the control computer, for instance, whenever a measurement change takes place.

The operation of all components in FIG. 4 is identical to the discussions of FIGS. 1 and 2. Using a dual channel coded drum, such as (a) (b) or (c) of FIG. 5, two sensors are used. Sensor 11A will use the existing pulse amplifier circuit and an aditional pulse amplifier is required for sensor 11B.

The illustrations (a), (b), or (c) of FIG. 5 are examples of code drum configurations. Many variations of the actual code structure are possible depending on the exact requirements of the output.

If miniature magnetic sensors are used in place of optical sensors the bits 17 on the coded drum 18 in FIG. 1 are a deposited magnetic based material deposited on a glass drum. The magnetic sensor requires additional electronic packaging of pulse shaping and amplifying circuits. The electronic package is identical in design to the illustration in FIG. 1.

In FIG. 6 high time stability is achieved using a tuning fork 110 which is driven by solenoid 120A and sensed by solenoid 120B. Sensors 111A and 111B mounted on the fork times, are moved synchronously across the vertical optical slit 112. This variation in design operates continuously at the tunded resonant frequency of the fork 110. Therefore the output at 106A, B, and C is synchronous signal with extremely high time modulation stability, both bit to bit and frame to frame.

FIG. 8 is the basic forms of signals required at the input and available at the output of the apparatus. The waveforms are representative of one configuration of design of the apparatus. A variety of configurations are possible depending on the requirements of any particular data system.

In FIG. 7, a signal in the form of a voltage pulse energizes solenoid 20 and lamp of light source 13. Light is emitted by light source slit 13 and passes through coded holes 17 of cylinder 18. Light is blocked by opaque cylinder material 16. Light passes from the coded holes 17 through optical slit 12.

Since an electric signal is on solenoid coil 20, the solenoid armature 21 causes tuned reed 10 to be drawn in the direction of the solenoid 20. A grating 12a, which is coupled to the reed 10, moves and an opening on the grating 12A allows light to pass through an integrating optical lens 12B and to a light sensor 11.

As the reed continues moving in the direction of the solenoid 20 the first opening will pass by the first light path and a second opening on the grating 12a allows light to pass through an integrating optical lens 12b to a light sensor 11.

The movement of the reed 10 and grating 12A continues until all light paths have been scanned. All of the above operation takes place in a very short interval of time. The light sensor 11, as a result of having light passed to it, will produce an electrical output. The electrical output will be in the form of a sequence of pulses where the exact time duration of each pulse and between each pulse is determined by the combined factors of rate and distance of travel of reed 10, exact hole positioning of grating and exact hole positioning on cylinder 18.

An environmentally adaptive transducer system is realized as a result of using the apparatus of this invention in the scheme illustrated in FIG. 3.

Proceeding next to a description of the invention as depicted in the accompanying figures 1A through 5A, reference will be made to an electrically driven time resonant scanning means, where in fact different scanning means may be employed, for example, a fluidic oscillator device driving a time resonant mechanical means such as a tuning fork or reed.

In FIG. 1A an electrical pulse, having square wave properties is applied to demand input terminals 1 and 2. A conventional integrated circuit pulse amplifier 7 places a similar square wave pulse at the assembly plate feed through terminals 4 and 5 and solenoid 20 is energized and the electro-magnetic field of armature 21 causes a resonant reed 10 to move toward the armature.

A fluidic pulse could be applied to fluidic interaction device with an operation similar to an electrical multivibrator. The output of the fluidic flip-flop would go to a solenoid type of fluidic device, where the armature action of the solenoid would cause the resonant reed 10 to move as stated above. A method for accomplishing this will be discussed more fully hereinafted with reference to the accompanying FIGS. 4A and 5A, as a separate and distinct invention, wherein the Mechano/Fluidic Oscillator's of these figures are represented as having (in FIG. 4A) feedback control to a bi-stable fluid amplifier, and (in FIG. 5A) combined integral vane-switched feedback and unique load switching characteristics of a bi-stable fluid amplifier.

Fluid energy in the form of a supply of air, for example, is applied at the fluid input port 3A and passes to a conventional fluid solenoid device 8A and on to fluid energy source 14. In operation, the electric or fluidic energy pulse referred to above causes the fluid solenoid device to pass fluidic energy to source 14 and source parts or jets 13 are arranged such that the coded drum 18, when placed properly will have each band of holes 16 aligned with the energy source ports or jets 13.

As the resonant reed 10 moves toward the armature 21, the sensing port of a capilliary fluid duct 11 moves over a discrete pattern of energy pulses emitting from the coded pattern of holes on coded drum 18. A pulse pattern emits from fluid duct 6 and moves to a conventional fluid amplifier 8B or directly to the fluid output port 3B.

When the reed 10 has scanned the coded drum 18 the input electrical or fluidic pulse disappears and energy source 14 turns off. As the reed 10 returns to a rest position, no output occurs.

In operation therefore, an input command causes an output sequence of pulses having time division multiplexed characteristics which occur at fluid output port 3B where the exact sequence of pulses and durations of time will be representative of the exact position of the coded drum 18.

The segment of coded cylinder in FIG. 2A shows a typical pattern of holes and variations in design possibilities. The resolution requirements and levels of a flow and/or fluid pressure will determine the exact dimensions of the holes of the coded cylinder.

In FIG. 3A a scanning grating 12A is used to provide a modulating restrictor which sequentially provides a serial representation of the coded pattern 16 and 17 of the coded drum 18 on the fluid output ports 11A, B, C, and D. Where one output port is desirable, all the lines 11A, B, C, and D are parallel to one output port.

In a static differential pressure logic system the port of fluid duct 11 becomes a simple interruptable jet and the holes 13 in assembly 14 are an atmospheric vent or return-to-source fluid path. The exhaust port therefore becomes part of a conventional turbulence amplifier control.

Referring now to the accompanying FIG. 4A, supply air enters the supply port 1 of a bi-stable fluid amplifier. Control ducts 2a and 2b are at equal pressures. The flow of air from supply port 1, according to the physical laws of operation of the bi-stable fluid amplifier, passes through duct 3a for example. Amplifier duct 3b has no air flow. The air passing out of drive ports 4a and the absence of air flow at control ports 4b cause the tuning fork tines to move apart. As both tines of the fork 5 move apart, fork tine 5b passes sensor port of control duct 2b. The resulting loss of pressure at control duct 2b is due to the fact that supply to the control duct 2b is interrupted, and the presence of pressure at control duct 2a causes the bi-stable fluid amplifier to switch output flow from duct 3a to duct 3b. As a result, air passing out of drive ports 4b, and the absence of air flow at control ports 4a, causes the tuning fork tines to move together. As the tines come together, tine 5a passes sensor port of control duct 2a. The resulting loss of pressure at control duct 2a and presence of pressure at control duct 2b causes the bi-stable fluid amplifier to switch output flow from duct 3b to duct 3a. As a result, the driving influence on the tuning fork continues to switch in the above manner and operation is self sustaining.

Load matching of the required fork responses and drive energies at the resonant frequency of the fork will yield self sustaining oscillation which will be insensitive to normal air supply changes, and the "frequency" of operation will be determined by the resonant mechanical frequency of the fork.

Referring to the accompanying FIG. 5A, supply air enters supply port 1 of a bi-stable fluid amplifier having specific load sensitivity features. Control ducts 2a and 2b are set to operate in such a way that load sensitivity of the fluid amplifier is increased. The flow of air from supply port 1 passes through duct 3a. Duct 3b has no air flow. Air passing out of drive ports 4a and the absence of air flow at drive ports 4b cause the tuning fork tines to move apart. As such tines move apart, a flag 6 on tine 5b tends to block duct 3a, and resulting output pressure increase causes the load sensitive bi-stable amplifier to switch to duct 3b with air flow output. Drive ports 4b then cause the tines of the fork to be driven together until flag 6 on tine 5b tends to block duct 3b. The mechanism continues self sustained operation in the above manner and assumes a stable operation at the resonant frequency of the fork.

Having regard to all the foregoing, the present invention consists of the inventive concepts embodied in the method, process, construction, arrangement of parts or new use of any of the foregoing and as herein particularly exemplified in any one or more specific embodiments of such concepts. Accordingly, various modifications can be made to such inventive concepts as herein disclosed. It is therefore intended that what is herein set forth should be regarded as illustrative of such concepts, and not for the purpose of limiting protection to any particular embodiment thereof, and that only such limitations should be placed upon the scope of protection to which the inventor hereof is entitled, as justice dictates.

What is claimed is:
1. A shaft angle encoder comprising:
(a) a housing,
(b) a rotatable shaft having an axis, said shaft being rotatably supported in the housing,
(c) angle coding means coupled to said shaft, said coding means containing indicia defined by alternately transparent and opaque regions arranged in a plurality of concentric, spaced-apart circular bands, said indicia when scanned at right angles to said bands, defining a plurality of unique code groups respectively characterizing each incremental angular position of said shaft,
(d) a source of light including means for directing a narrow beam of light through said coding means,
(e) scanning means including a driven, vibratory scanning element located within said housing and positioned in proximity to said narrow beam of light for transversely scanning all of said bands in sequence and thereby receiving light from said source,
(f) electrical driver means coupled to said scanning element for vibrating the same in response to a command signal applied to said driver means,
(g) said scanning means including a photodetector associated with said scanning element so as to receive light from said source after it has passed through said coding means for producing a repetition of groups of digital signals each characteristic of the indicia code group scanned by said photodetector at any given incremental angular position of said shaft.

2. A shaft angle encoder as claimed in claim 1 wherein means is provided for sensing incremental changes in the position of said shaft and for producing a signal upon the occurence of any such incremental change, said means comprising a lamp and a photodetector positioned on opposite sides of said coding means, said coding means having an additional set of indicia comprising a series of equi-spaced opaque lines of equal length arranged in a band, said last-mentioned photodetector being positioned adjacent said last-mentioned band, in line with said lamp.

3. A shaft angle encoder as claimed in claim 1 wherein said scanning means is a tuning fork having a pair of tynes, and wherein said photodetector is affixed to one of said tynes.

References Cited
UNITED STATES PATENTS

| | | | |
|---|---|---|---|
| 3,437,814 | 4/1969 | Zuckerbraun | 250—203 |
| 3,373,266 | 3/1968 | Engel et al. | 340—347 |
| 3,254,227 | 5/1966 | Hock | 250—235 X |
| 3,176,083 | 4/1965 | Hauser. | |
| 2,986,725 | 5/1961 | Dirks. | |
| 2,069,632 | 2/1937 | Thomas. | |
| 1,942,067 | 1/1934 | Owens. | |
| 1,937,089 | 11/1933 | Kleber. | |
| 1,387,240 | 8/1921 | Collis | 356—26 |
| 3,089,133 | 5/1963 | Koulicovitch | 340—347 |

MAYNARD R. WILBUR, Primary Examiner

J. GLASSMAN, Assistant Examiner